Figure 2:
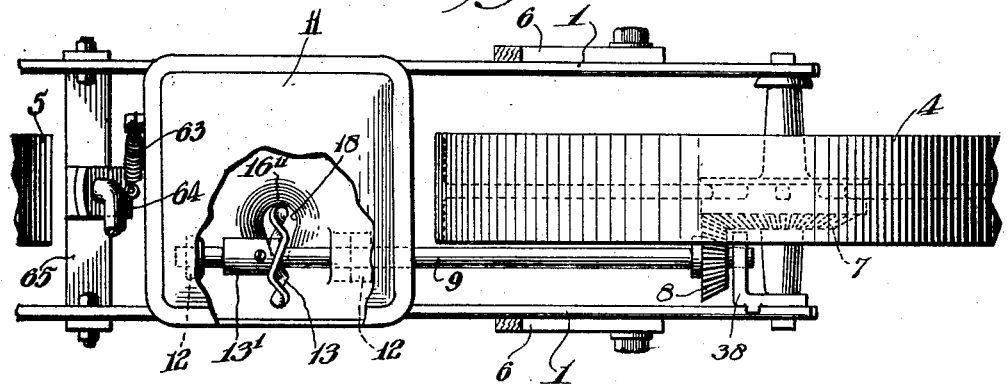

April 19, 1927.

S. H. YANCEY

SEED DRILL

Filed Sept. 26, 1925    2 Sheets-Sheet 1

1,625,345

Inventor
Samuel H. Yancey,
By
Attorneys.

April 19, 1927.
S. H. YANCEY
SEED DRILL
Filed Sept. 26, 1925    2 Sheets-Sheet 2
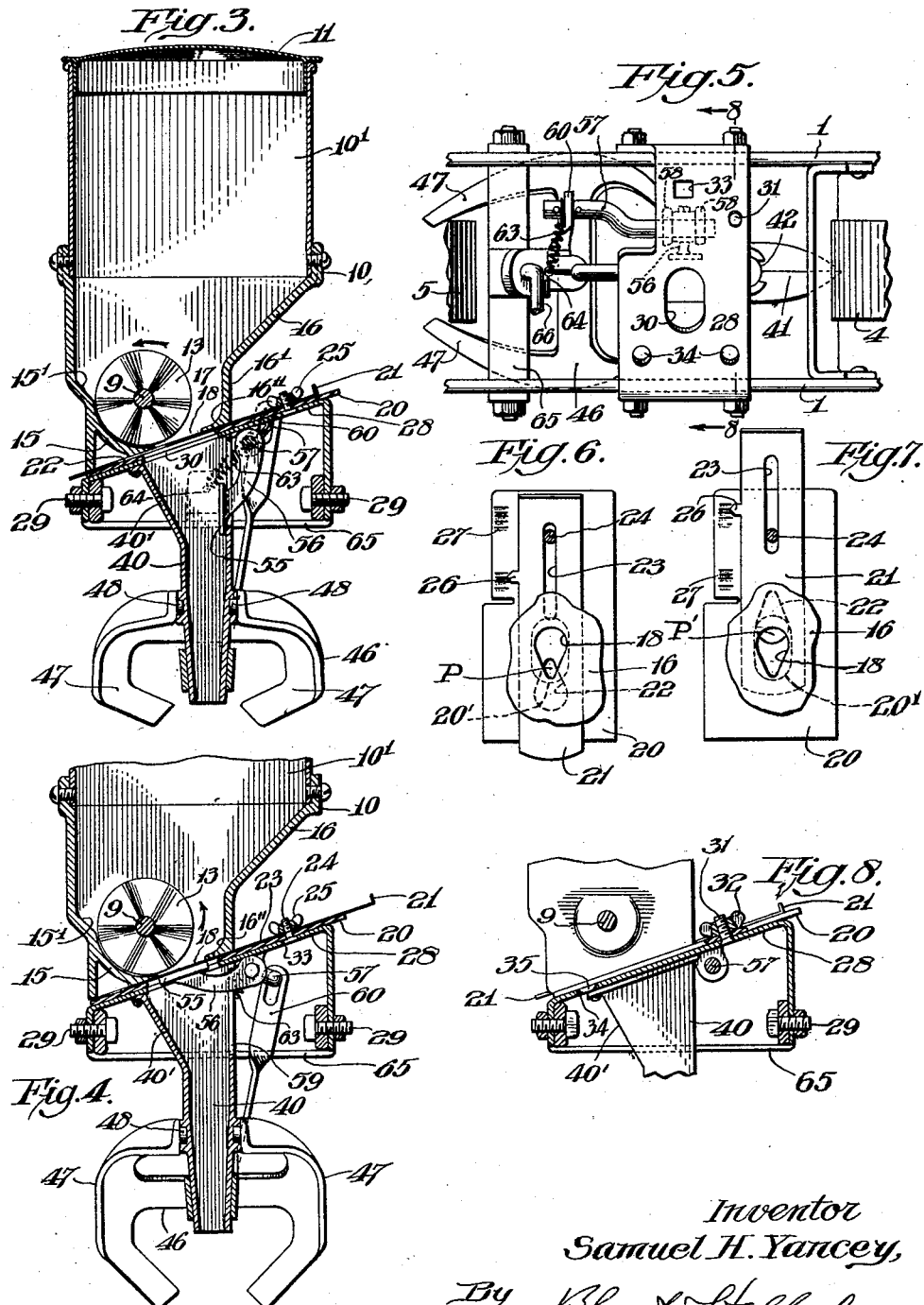
Inventor
Samuel H. Yancey,
By
Attorneys.

Patented Apr. 19, 1927.

1,625,345

UNITED STATES PATENT OFFICE.

SAMUEL H. YANCEY, OF PHILADELPHIA, PENNSYLVANIA, ASSIGNOR TO S. L. ALLEN & CO., INC., A CORPORATION OF PENNSYLVANIA.

SEED DRILL.

Application filed September 26, 1925. Serial No. 58,731.

My invention relates to seed drills for sowing seeds of various kinds and sizes, a principal object of the invention being to provide a drill which is satisfactorily operative to sow both large and small seeds as well as to provide a drill having various improvements and advantages over the forms of drills heretofore proposed.

Many agriculturists own but a single seed drill but utilize the same in sowing many different sorts of seeds in their farming operations, the sizes thereof ranging from very small seeds, such as turnip seed, to relatively large seeds, such as peas or beans, and in order to insure the most satisfactory crop, it is necessary that the seeds, whatever be their size, be distributed evenly in the furrow in a substantially predetermined amount for each linear yard thereof and without any bruising or crushing of the seeds as they pass through the drill.

Seed drills as hitherto manufactured and employing but a single seed feed opening through which the seeds, whatever be their size or character, are fed, have not been entirely satisfactory to accomplish these results, however, because while they may operate properly when adjusted to sow small seeds they are less satisfactory when adjusted to sow large seeds or vice versa, as under one condition or the other they tend to crush or damage the seeds or the latter tend to jam in the feed openings with consequent irregular feeding and sometime entire cessation of any feed at all.

More particularly, therefore, the present invention contemplates the provision of a seed drill having adjustable means which may be so operated as to provide a seed feed opening of comparatively small size and in relatively close association with the seed agitator wheel for use when seeds of relatively small size are being sown, or to form another and larger seed feed opening disposed somewhat more remotely from the agitator wheel for use when seeds of relatively large size are being sown, said means being operable to graduate or adjust the size of either opening as may be desired in order to adapt it for the particular kind of seed which is being used.

Further objects of the invention are to provide a seed drill embodying means for cutting off the flow of seed through the seed feed opening when desired, said means being either manually operable or preferably arranged in association with a furrow closer or coverer in such manner that upon the machine being raised said means will be operated automatically to shut off the flow of seed.

Still further objects of the invention are to provide a seed drill having a removable hopper, in which is disposed an agitator wheel for agitating the seeds, which is of such form and construction as to prevent lodgment or jamming of seeds between the wheel and the wall of the hopper or between the wheel and the seed feed opening and which, additionally, may be cast, and thereafter internally machined in the vicinity of the path of the agitator wheel if desired, at a minimum expense.

My invention further contemplates the general improvement and simplification of seed drills of the general character of that to which my invention relates and further includes such other objects and novel features of design and construction as are hereinafter more definitely specified or which will be apparent from the accompanying drawings in which I have illustrated one form of seed drill constructed in accordance with my invention.

Figure 1:
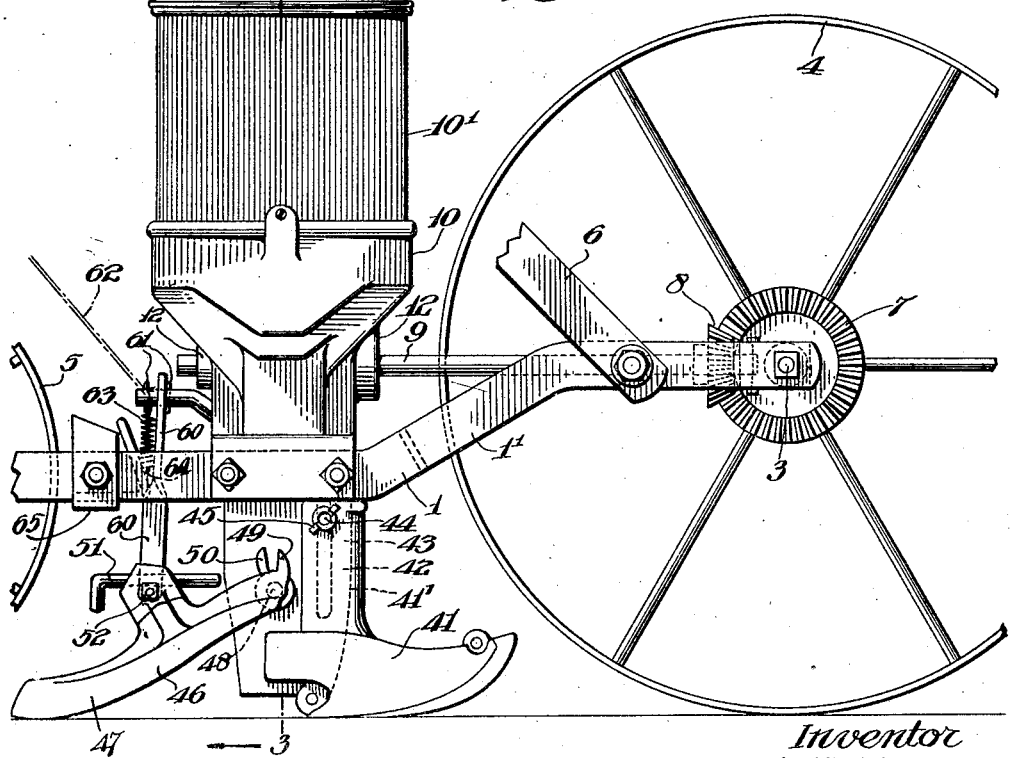

In the said drawings Fig. 1 is a fragmentary side elevation of the drill and Fig. 2 a top plan view thereof with certain portions broken away. Fig. 3 is a vertical section on line 3—3 of Fig. 1 looking in the direction of the arrows and Fig. 4 a similar but fragmentary view with certain of the parts in a different position. Fig. 5 is a fragmentary top plan view of the hopper saddle and adjacent parts with the hopper removed; Fig. 6 a fragmentary top plan view of a portion of the bottom of the hopper showing the opening therein and the subjacent seed feed regulating slide and base plate illustrating the relative position of these parts when the machine is adjusted for the sowing of small seeds; Fig. 7 is a similar view showing the relative position of the parts when the machine is adjusted for sowing fairly large seeds and Fig. 8 is a fragmentary vertical section on line 8—8 of Fig. 5 looking in the direction of the arrows. Like numerals are used to designate the same parts in the several figures.

As shown, the drill comprises a pair of laterally spaced horizontally disposed frame bars 1, 1 between the forward ends of which is supported an axle 3 on which the drive wheel 4 is suitably mounted for rotation. The drill is also provided with a follower wheel 5, shown fragmentarily, which is rotatably mounted on an axle supported adjacent the rear ends of the frame bars in the ordinary manner, and as the diameter of the drive wheel is preferably greater than the follower wheel the frame bars adjacent the periphery of the former may be directed downwardly and rearwardly as at 1' and then again turned horizontally, as shown in Fig. 1, so that when the rims of both wheels are resting on the ground the bars, save for their said angularly directed portions, will extend substantially parallel thereto. Attached to the bars at a convenient point in the rear of the axle 3 are the handles 6 which extend rearwardly and angularly upward in the ordinary manner, while the drive wheel is provided with a bevel gear 7 cooperative with a pinion 8 disposed near the forward end of the rearwardly extending agitator shaft 9 whereby when the machine is pushed over the ground the rotation of the agitator shaft will be effected. The several parts to which reference has just been made are of well known construction so that further description thereof is unnecessary.

For containing the seed, the drill is provided with a vertically disposed removable hopper which is positioned behind the drive wheel and may comprise a lower portion 10, preferably of cast iron, and an upper portion 10' suitably united therewith which may conveniently be formed of sheet metal, thus minimizing the weight of the hopper as a whole. The extreme upper end of the hopper may be closed by a hinged lid 11 or in any other convenient way.

The lower part 10 of the hopper may be provided on each side with bosses 12 which are bored for the passage of the agitator shaft 9 and in which it is journaled, the shaft extending entirely through the hopper and carrying within the latter the agitator wheel 13 which may be mounted on a hub 13' which surrounds and is pinned to the shaft. While the agitator wheel may partake of different forms I prefer to employ a wheel of the form best shown in Fig. 2 and which consists of a relatively thin circular plate of metal which is plane at its center and bent or fluted radially outwardly in alternate directions from the central plane so that its periphery, when viewed edgewise, has the appearance of a sinuous line crossing and recrossing said central plane. Agitator wheels of this general type are well known having been found to be very effective in stirring up and agitating the seed but, as stated, other types of wheels may be employed if desired. In practice, the wheel and hub 13' may conveniently be formed as a single casting and the periphery of the wheel ground or otherwise machined so that it will run true with the axis of the shaft.

As I prefer to dispose the hopper symmetrically with respect to the center line of the drill and as the shaft 9 must necessarily clear the rim of the drive wheel, the shaft is laterally offset from the said center line but extends parallel thereto (see Fig. 1) so that the shaft is arranged to pass through the hopper somewhat on one side of the center thereof, and in order to assist in concentrating the seed in the bottom of the lower part of the hopper and adjacent the agitating wheel and seed feed openings hereinafter described, the walls of the lower part of the hopper are all inclined inwardly and downwardly in the general direction of the wheel which, in operation and when the drill is being forwardly propelled, rotates in the direction of the arrows in Figs. 3 and 4. It is desirable, however, in order to prevent the seeds from being crushed between the periphery of the wheel and the wall of the hopper that the latter be arranged very closely adjacent that portion of the circumference of the wheel which lies in the lower quadrant of that side of the wheel in the direction in which it is turning, as it is at this point that there is the greatest likelihood of the seeds being drawn in and crushed between the wheel and the wall of the hopper; thus, the portion of the wall designated as 15 and lying adjacent the wheel in the region referred to is curved on its inner face to correspond with the curvature of the rim of the wheel and arranged to lie very closely adjacent the latter. This curved portion of the wall is preferably extended downwardly to terminate in a feathered edge slightly in rear of a vertical plane passing through the axis of the wheel and is extended upwardly in the opposite direction approximately to a horizontal plane passing through said axis, from which point it is turned outwardly, preferably at an angle of about 45°, as at 15', to merge into the vertical wall of the hopper at a point considerably removed from the wheel. Thus that portion of the seed which feeds down against the inclined region 15' is prevented from being drawn in or jammed between the edge of the wheel and the wall of the hopper by reason of the relatively obtuse angle formed between the region 15' and the wheel and the relatively slight clearance between the wheel and the region 15 of the wall. It will further be noted that since the curved region 15 of the wall terminates in or a little below the horizontal plane passing through the center of the wheel, said surface does not present any overhanging or "undercut" portion; thus the casting of the lower part 10 of the hopper is greatly facilitated and, additionally, if it be desired to finish the curved region in order to make the clearance between the wheel and said region as small as possible while keeping the wheel out of contact with the surface, a suitable tool can be readily introduced for this purpose through the upper end of the hopper and the surface finished to a perfectly true arc, an operation which would be extremely difficult if the surface was extended above said horizontal plane and thus presented an overhanging region.

The wall of the hopper opposite to that to which reference has just been made is angularly downwardly inclined as at 16, then turned vertically downward as at 16' and thence forwardly toward the agitator wheel to terminate in a thin edge 16'' at a relatively considerable distance in the rear of the wheel so as to present a substantially vertically extending passage 17 through which the seed may feed to the feed opening 18 formed in the bottom of the hopper in alignment with the agitator wheel, this opening being of the form best shown in full lines in Figs. 6 and 7, to wit, having its rear edge, that is, the edge furthest removed from the agitator wheel, approximating a semi-circular arc and its side edges forwardly and oppositely inwardly inclined to merge into its front edge which also conforms to a substantially semi-circular arc but is of materially less radius than the arc forming the rear edge. While the relative portions of the radii of these arcs may vary considerably I have found in practice that satisfactory results are obtained when said radii are in the ratio of substantially 1:5 or, in other words, when the radius of the arc forming the forward end of the opening is about one-fifth as long as the radius of the arc forming the rear end. The peculiar conformation of this opening is an important feature of my invention as will hereafter more fully appear.

The lower extremity of the hopper is inclined upwardly from the forward or small end of the seed opening toward the larger or rear end, preferably so that a plane extending through the edges of the opening will form an angle of about 20° with the horizontal, and to the bottom of the hopper is suitably secured a base plate 20 which is provided with an opening 20' registering with the opening 18. The shape and size of this opening are immaterial so long as its edges do not overlap those of opening 18. The base plate is extended outwardly beneath the wall 16 and upon it is slidably seated the feed regulating slide 21 which extends between the lower end of the hopper and the plate, the former being slightly cut away to provide a groove or channel for the reception of the slide so that the latter is capable of being moved beneath the hopper and transversely of the machine in either direction. This slide is provided with an opening 22 which is preferably of the same size and shape as the feed opening 18 but is disposed in the plate in a direction reverse to that of the feed opening; in other words, the small end of the opening 22 is directed rearwardly toward the wall 16' whereas the small end of the feed opening 18 is directed forwardly or away from said wall, and the position of the opening 22 in the slide is such that it may be caused to register with the opening 18 by moving the slide back and forth. For limiting the movement of the slide the latter is also provided with a slot 23 which encloses a pin 24 mounted in the plate and threaded for the reception of a wing nut 25 by the tightening of which against the slide the latter may be held in any predetermined position within the limits of movement determined by the slot 23. Preferably the slide is provided with a pointer 26 and the plate with an index 27 showing the names of different kinds of seeds, the position of the various names on this index being so calculated that when the pointer is brought into registration with any particular name the relative positions of the openings 22 and 18 will be such as to provide the proper sized feed opening for such seed as will hereafter more fully appear.

The hopper, agitator shaft 9 and plate 20 thus form a unit which is so arranged as to be readily removable from the drill as a whole thereby facilitating the dumping out of any seed remaining in the hopper after a given seeding operation is completed, and to this end and for operatively and removably supporting the hopper and its attached parts upon the frame of the machine, a transversely extending saddle 28 is provided the upper surface of which is inclined in correspondence with the plate 20 so that when the latter is seated on the saddle the hopper will be in a substantially vertical position. The ends of the saddle overhang and are securely bolted to the frame bars as by bolts 29 and the saddle is provided with an opening 30 registering with the opening 20' in the plate and conveniently of similar size and shape so as to form no obstruction to the feed of the seed whatever may be the adjusted position of the regulating slide 21. For securing the hopper on the saddle the latter carries a threaded stud 31 adapted for the reception of a wing nut 32 and the plate is provided with a hole for the passage of the stud, while for assisting in holding the plate securely on the saddle and preventing it from sliding about, the saddle may be provided with an opening 33 and other openings 34 respectively positioned to receive the head 35 of the stud 24 which projects below the plate and the heads of the screws by which the latter is secured to the hopper. Thus when the latter is placed on the saddle the heads of the studs and screws brought into registry with the openings designed for their reception and the stud 31 passed through a properly located hole in the plate, the latter is restrained from any sliding motion on the saddle and the sole duty required of the wing nut 32 is to clamp the parts together vertically. Consequently the hopper can be readily removed from the plate by merely taking off the wing nut 32 and as readily operatively secured in position thereon by replacing the nut.

To insure the proper meshing engagement of the pinion 8 and ring gear 7 when the hopper is in position, the extreme forward end of the agitator shaft 9 is journaled in a bracket 38 secured to the adjacent frame bar from which it may be readily withdrawn when removing the hopper by pulling the same slightly rearwardly after the wing nut 32 has been removed and the hopper lifted so as to clear the plate 20 from the stud 31, while when the hopper is being replaced, the end of the shaft is first entered in the bracket and the hopper then moved slightly forward so as to bring the plate into proper registry with the saddle.

For conveying the seed to the furrow after it passes through the feed opening a seed chute 40 is provided, conveniently in the form of a hollow casting which is riveted to the under side of the saddle to extend vertically downward therefrom, the upper end of the chute registering with the opening 30 in the saddle. Preferably the chute is arranged to deliver the seed to the furrow substantially on the center line of the machine, and to this end the major portion of the chute is therefore disposed symmetrically with respect to that line and one wall 40' flared outward and upwardly so as to effect proper registration with the opening 30 at the upper end of the chute where it joins the saddle. The chute is operative to support the furrow opening plow 41 which may be of any desired form and is preferably arranged for vertical adjustment with respect to the chute so that the plow can be set to open a furrow of any desired depth. Conveniently for this purpose the plow may be provided with a split vertical extension 41' embracing a rib 42 on the forward face of the chute which is provided with a slot 43 in which a bolt 44 carried by the extension is free to slide, this bolt supporting a thumb nut 45 by which the sides of the extension may be pinched together against the rib so as to hold the plow in any desired position of vertical adjustment with respect to the chute.

The chute is also operative to support the furrow closer or coverer 46 which comprises a pair of rearwardly and oppositely inwardly curved arms 47 disposed on opposite sides of the chute and pivoted thereto on trunnions 48. For limiting the downward movement of the coverer one of the arms may be provided with a dog 49 cooperative with a fixed stop 50 on the chute while a longitudinally adjustable pin or stop 51, the forward end of which is adapted to engage the rear wall of the chute, may be provided for limiting the extent of the upward movement of the coverer, this stop being conveniently gripped between the two halves of the coverer which are united by a bolt 52. Thus by loosening the bolt the position of the stop may be adjusted while by removing it entirely the two halves of the coverer may be separated so as to permit their detachment from the drill in case it be desired to employ the latter without the coverer.

Means are also provided for entirely shutting off the flow of seed to the chute, said means in their preferred embodiment and as shown being arranged for automatic actuation through the medium of the furrow coverer when the latter is used or, in its absence, for manual actuation. Said means may therefore comprise a shut-off plate 55 supported at one end of arm 56, the plate being of suitable size and shape to substantially fill the opening 18 in the hopper. The arm 56 is mounted on a shaft 57 the forward end of which is journaled in brackets 58 depending from the saddle in such manner that rotation of the shaft will cause the arm to be moved from a position in which the plate is disposed substantially in alignment with and adjacent the wall of the chute as in Fig. 3 to a position in which the plate is disposed over the opening 18 as in Fig. 4 so as to close the same, the wall of the chute being slotted as at 59 to permit the passage of the arm. The shaft 57 is extended rearwardly of the saddle and slightly laterally offset as best shown in Figs. 4 and 5 so as to form, in effect, a crank, and a downwardly depending slotted link 60 engages over the shaft at its upper end and is pivotally connected with the coverer at its lower in such manner that when the latter is raised, as shown in Fig. 1, the link will be pushed up so as to rotate the shaft and swing the arm and shut-off plate downwardly to the position shown in Fig. 3, while when the coverer is lowered the link will operate to rotate the shaft in the opposite direction and swing the plate up to shutting-off position as shown in Fig. 4.

In the operation of sowing seeds, the drill is propelled forwardly and the rear free ends of the furrow coverer rest on the ground substantially in the same plane as the points of contact of the drive and follower wheels therewith; thus the shut-off plate is maintained in its lowermost position to permit the seed to freely flow through the opening 18. When the end of the row is reached the operator ordinarily raises the follower wheel from the ground before turning the drill about on the drive wheel so as to prepare to traverse the field in the opposite direction; this lifting of the rear end of the drill permits the furrow coverer to drop from its normal position for a sufficient distance to rotate the shaft 57 and swing the shut-off plate upwardly to automatically shut off the flow of seed through opening 18 but as soon as the machine is turned in the proper direction to commence the new row and the follower wheel lowered to engage the ground, the coverer is correspondingly raised to normal position so as to again swing the shut-off plate down and clear the opening 18. Thus when the coverer is used with the drill the control of the seed flow is entirely automatic, the flow being established whenever the drill is resting on the ground in operative position and being interrupted whenever the rear end of the drill is lifted as when turning the end of a row or the like.

However, under certain conditions it may be desired to dispense with the coverer entirely and to this end the parts are so arranged that, as hitherto explained, the coverer may be readily detached from the machine together with the link 60, the latter being preferably maintained in engagement with the shaft 57 with a pair of removable cotter pins 61. Therefore, to enable the shaft 57 to be manually actuated with a maximum of convenience under such conditions, a cord or wire 62 may be connected to the end of the shaft and run to a point adjacent the grips of the handles 6 so that by pulling on the cord the shaft may be rotated to raise the shut-off plate to shut-off position, a spring 63 being preferably connected between the shaft and a suitable point, such as a clip 64 mounted on a transverse member 65 extending between the frame bars, in such a way as to hold the shaft in either of its two limit positions of rotation and thereby maintain the shut-off plate either raised or lowered as may be desired. This result may be conveniently accomplished by so mounting the spring that when the crank formed on the shaft is thrown from one limit position to the other the spring will pass over center and thus tend to hold the crank in either position to which it may be turned. Hence by pulling up on the cord the shut-off plate may be caused to descend and allow the seed to feed or by pushing down on the shaft conveniently with the toe, the plate may be lifted so as to interrupt the flow. It should be noted that it is unnecessary to remove the spring from the drill when the furrow coverer is employed and the shut-off plate thereby automatically actuated as the spring does not in any way interfere with such actuation; it may therefore, when the coverer is used and connected with the shut-off plate, be allowed to remain in position as shown in the drawings or may be simply unhooked from the shaft and allowed to freely depend from the clip or else removed entirely from the drill. Of course, if desired, the coverer may be used without connecting it with the shaft through the medium of the link 60 under which conditions the actuation of the shut-off plate will be accomplished manually in the same way as when the coverer is entirely omitted.

The clip 64 may be conveniently availed of to pivotally support the inner end of a reversible furrow marker 66 a portion of which is shown in certain of the figures but which forms no part of the present invention.

In operation, the slide 21 is adjusted, conveniently by means of the index, for the particular seed which is to be sown and then secured in position by the wing nut 25. From a consideration of Figs. 6 and 7 it will be apparent that the cooperative relation between the opening in the slide and the opening in the bottom of the hopper is such that in certain positions of adjustment of the slide, as when it is moved toward the forward end of its travel, a seed feed opening or passage P of relatively small effective area or size will be provided through the hopper and slide which opening is only a short distance in the rear of the vertical plane through the axis of the agitator wheel, while when the slide is moved towards the rear end of its travel another and entirely distinct seed feed opening or passage P' of relatively greater effective area or size will be provided at a point considerably further in the rear of said plane. Thus by suitable adjustment of the slide a seed feed passage P may be provided which is particularly adapted for the satisfactory feeding of small seeds, this passage being so situated with relation to the agitator wheel that seeds of this character will be pushed through the passage by the wheel without jamming or being crushed or cracked between the periphery of the wheel and the edge of the passage, while by other adjustment of the slide another entirely distinct feed passage P' may be provided so located with respect to the agitator wheel that seeds of larger type will feed therethrough without jamming, cracking or crushing.

In the practical operation of machines constructed in accordance with the present invention, it has been found that the difficulties inherent in previous seed drills employing but a single feed opening in conjunction with means for regulating the size of that opening when sowing different kinds of seed, and to which reference has hitherto been made, are entirely overcome, this result, it is believed, being due in large part to the provision of an opening of relatively small size located closely adjacent the wheel for the sowing of small seeds and an opening of relatively greater size located considerably further in the rear of the wheel for the sowing of large seed, each of said openings being variable as to size so as to accommodate and control the feed of the various sorts and sizes of seed within the particular range for which each opening is intended. In this connection it should be additionally noted that by reason of the angular disposition of the bottom of the hopper with relation to the periphery of the wheel, there is a relatively small space between the rear edge of the small seed feed opening P and the periphery of the wheel and a much greater space between the corresponding edge of the large seed opening P' and the periphery of the wheel, a condition which appears to assist in preventing the cracking or bruising of the seeds between the wheel and the edges of the particular opening being employed.

It will of course be obvious that as the regulating slide is moved rearwardly from the position indicated in Fig. 6 towards that indicated in Fig. 7 the effective area of the seed passage P will increase until the slide attains a position in which the opening in the slide is in registry with the opening in the hopper to the maximum extent which is possible. This will result in the formation of a relatively very large passage of almost circular form and of greater area than is ordinarily practical for the sowing of seeds of the general class for which seed drills are ordinarily used. It will therefore be understood that it is not intended in the practical employment of a drill constructed in accordance with the present invention that the passage so formed should be utilized for sowing seeds of any sort but that the small passage P adjacent the agitator wheel will be used for the smaller seeds and adjusted to present an effective area suitable for the particular seed being sown and that when seed of larger size than can be best taken care of by this passage P is to be sown, the regulating slide will be moved so that the other and independent passage P' disposed at a greater distance from the agitator wheel and adjusted to the particular seed to be sown will be formed and thereafter utilized for such seed. Preferably, and as shown in said figures, the index will therefore be arranged in two separated parts, one indicating the various adjustments for seeds which may suitably be fed through the smaller passage and the other for seeds which may be suitably fed through the larger, the blank space on the index lying between these two areas corresponding to the opening formed when the opening in the regulator slide is in maximum or substantially maximum registry with the opening in the hopper.

As hitherto pointed out the hopper may be readily removed from the machine when desired to enable any residual seed to be dumped out at the completion of a given seeding operation or for other purposes, which removal in no wise interferes with the adjustment of the regulating slide so that the latter need never be disturbed when removing or replacing the hopper. Additionally, by reason of the peculiar formation of the bottom of the hopper and the relative position of the opening therein and the agitator wheel, the former is at all times readily visible from the top of the hopper, thus enabling a desired adjustment of the regulating slide so as to afford a feed passage of any particular size to be readily effected without reference to the index, although under ordinary conditions it is more convenient to employ the latter in adjusting the drill for the sowing of any particular kind of seed the name of which appears thereon.

While I have herein described and illustrated a preferred form of my invention with considerable particularity I do not thereby desire or intend to specifically limit myself thereto nor to any precise details of design, construction and arrangement of the various parts as if desired the same may be modified in various particulars from the precise embodiments shown without departing from the spirit and scope of the invention as defined in the appended claims.

Having thus described my invention, I claim and desire to protect by Letters Patent of the United States:

1. A seed drill comprising a seed hopper having an opening in its bottom, a regulating slide also having an opening and an agitator wheel mounted for rotation within the hopper, said slide being adapted for movement to and fro with respect to the hopper whereby one part of the opening in the slide may be caused to register with one part of the opening in the hopper so as to provide a relatively small passage through both slide and hopper disposed closely adjacent the periphery of the wheel, or another part of the opening in the slide may be caused to register with another part of the opening in the hopper so as to provide another and relatively larger passage through both slide and hopper at a point more remote from the periphery of the wheel.

2. A seed drill comprising a frame, a seed hopper positioned on the frame and having an opening in its bottom, one end of said opening substantially conforming to a semicircular arc and the sides of the opening respectively converging inwardly toward the other end, a regulating slide movable with respect to the hopper and having an opening similar in shape to the opening in the hopper but reversely turned with respect thereto, and an agitator wheel mounted for rotation in the hopper with its periphery extending closely adjacent the opening therein, said slide being capable of movement to and fro with respect to the hopper whereby when the slide is moved in a direction to cause the smaller end of its opening to approach the corresponding end of the other opening, a seed passage lying closely adjacent the wheel will be defined by the edges of the openings and when the slide is moved in the opposite direction so as to cause the larger end of its opening to approach the corresponding end of the other opening, another and separate seed passage will be defined by the edges of the openings lying at a greater distance from the periphery of the wheel.

3. In a seed drill, a hopper and a non-flexible seed agitator wheel mounted for rotation within the hopper on a horizontal axis, a portion of the wall of the hopper conforming to the periphery of the wheel and lying closely adjacent thereto, the lower end of said portion terminating substantially in a vertical plane through the axis of rotation of the wheel and the upper end of said portion terminating substantially in alignment with a horizontal plane passing through said axis.

4. In a seed drill, a hopper and a non-flexible agitator wheel mounted for rotation in said hopper on a horizontal axis, a portion of the wall of the hopper conforming and lying very closely adjacent to that portion of the periphery of the wheel which is disposed in one of the lower quadrants of the wheel, the lower edge of said portion terminating substantially in a vertical plane passing through the axis of rotation of the wheel and the upper end of said portion terminating substantially in a horizontal plane passing through said axis.

In witness whereof I have hereunto set my hand this 25th day of September, 1925.

SAMUEL H. YANCEY.